United States Patent
Thielert

(10) Patent No.: US 7,244,405 B2
(45) Date of Patent: Jul. 17, 2007

(54) METHOD FOR CLEANING COKE OVEN GAS

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 0 days.

(21) Appl. No.: 10/477,021

(22) PCT Filed: May 7, 2002

(86) PCT No.: PCT/EP02/05019

§ 371 (c)(1),
(2), (4) Date: Apr. 21, 2004

(87) PCT Pub. No.: WO02/089958

PCT Pub. Date: Nov. 14, 2002

(65) Prior Publication Data

US 2004/0191145 A1   Sep. 30, 2004

(30) Foreign Application Priority Data

May 9, 2001  (DE) ............................. 101 22 546

(51) Int. Cl.
*B01D 53/34* (2006.01)
(52) U.S. Cl. ............................................ 423/237
(58) Field of Classification Search ............... 423/237, 423/238, 239.1, 235
See application file for complete search history.

(56) References Cited

U.S. PATENT DOCUMENTS

| 3,962,405 | A | * | 6/1976 | Annesser et al. | ...... 423/243.11 |
| 3,993,730 | A | * | 11/1976 | Cooper | ...... 423/225 |
| 4,170,550 | A | * | 10/1979 | Kamody | ...... 423/225 |
| 4,183,902 | A | * | 1/1980 | Hashimoto et al. | ...... 423/210 |
| 4,499,060 | A |   | 2/1985 | Herpers et al. | |

FOREIGN PATENT DOCUMENTS

| DE | 2537640 | 2/1977 |
| DE | 2734497 | 2/1979 |
| DE | 3004757 | 7/1981 |
| DE | 19603837 | 8/1997 |
| GB | 2057411 | 4/1981 |

OTHER PUBLICATIONS

Chemie-Ingenieuer-Technik (Chemcial Engineer Technology) (1974) 15, p. 628—To Follow.

* cited by examiner

*Primary Examiner*—Edward M. Johnson
(74) *Attorney, Agent, or Firm*—Collard & Roe, P.C.

(57) ABSTRACT

A method for cleaning coke oven gas by washing the gas, whereby a washing liquid is guided into a washing liquid circuit and impurities in the washing liquid are expelled in a desorber. According to the invention, the coke oven gas is washed with caustic soda in a counter flow. The caustic soda is regenerated in the desorber by expelling acid gas components and ammonia.

6 Claims, 2 Drawing Sheets

METHOD FOR CLEANING COKE OVEN GAS

CROSS REFERENCE TO RELATED APPLICATIONS

Applicant claims priority under 35 U.S.C. §119 of German Application No. 101 22 546.6 filed on May 9, 2001. Applicant also claims priority under 35 U.S.C. §365 of PCT/EP02/05019 filed on May 7, 2002. The international application under PCT article 21(2) was not published in English.

BACKGROUND OF THE INVENTION

1. Field of the Invention

The invention relates to a method for cleaning coke oven gas by washing the gas, whereby a washing liquid is guided into a washing liquid circuit and impurities in said washing liquid are expelled in a desorber. Such a method is known from Cheme-Ingenieur-Technik [Chemical Engineer Technology](1974) 15, page 628.

2. The Prior Art

In the known method, washing the gas takes place with a washing liquid that contains ammonia, which causes ammonia to become concentrated in the washing liquid circuit between the gas washer and the desorber. Ahead of the desorber, caustic soda is put into the washing liquid circuit, in order to split non-strippable ammonium salts into ammonia and NaCl. The desorption process is carried out in two stages. In a first desorption stage, the acid gas components are expelled from the charged washing liquid. A partial stream of the liquid stream drawn off from the desorber is passed to a second desorber, in which ammonia is expelled with steam. The ammonia expelled here is passed back to the washing liquid circuit. The two-stage desorption process is complicated, in terms of process technology and control technology, since on the one hand, the aim is to completely remove the acid gas components and, at the same time, a sufficient amount of ammonia must remain in the washing liquid circuit.

SUMMARY OF THE INVENTION

The invention is based on the object of indicating a method for cleaning coke oven gas by washing the gas, which can be more easily managed in terms of control technology.

Proceeding from the method described initially, this object is accomplished, according to the invention, in that the coke oven gas is washed with caustic soda in a counterflow, and that the caustic soda is regenerated in the desorber by expelling the acid gas components and ammonia. According to the invention, the desorber functions as a total desorber. Here, all the acid gas components as well as ammonia are expelled, so that only caustic soda remains in the liquid phase. Absorbent losses are balanced out by adding NaOH, which is preferably placed into the regenerated caustic soda ahead of the gas washing process. Waste water that contains a sodium salt is withdrawn from the washing liquid circuit. The liquid loss is preferably made up by coal water, which can contain ammonia components.

There are various possibilities for further configuring the method according to the invention. According to a preferred embodiment, the gas washing process is operated in two stages, and comprises a first alkaline washing stage for the acid gas components, as well as a second washing stage, which works in the neutral to acidic pH range, for the absorption of ammonia.

The caustic soda is put in at the head of the first washing stage, while the coke oven gas to be cleaned is passed in at the foot of the second washing stage, flows through the two washing stages, one after the other, and is drawn off at the head of the first washing stage. The washing liquid that flows out of the first washing stage is passed to a top segment of the second washing stage. In the embodiment according to the invention, the caustic soda is first used as the washing liquid for the absorption of acid gas components, particularly $H_2S$. The pH of the washing liquid decreases as a result of the absorption of the acid gas components, so that in the second washing stage, the washing liquid can be used for the absorption of ammonia. The liquid that runs out of the second washing stage is passed to the desorber and is regenerated here, by expelling all the acid gas components as well as the ammonia. The two washing stages can be implemented as separate absorbers, or can be integrated into a single apparatus.

Another embodiment of the method according to the invention provides that the coke oven gas to be cleaned is washed with caustic soda in a first absorber, and subsequently passed to a second absorber, in which ammonia is removed from the gas stream. Only the washing liquid from the first absorber is passed to the desorber, in which the caustic soda is regenerated and acid gases as well as ammonia are expelled.

The regenerated caustic soda is separated, in a separating stage, into a concentrate stream that is passed back into the first absorber and a liquid stream that is essentially free of NaOH. The liquid stream that is essentially free of NaOH is passed to the second absorber as the washing liquid, and here is used for the absorption of ammonia. The washing liquid drawn from the second absorber is passed back to the first absorber. The separating stage is preferably operated as reverse osmosis, whereby reverse osmosis membranes, which have a high retention capacity for NaOH, are used. The retention capacity is about 99 to 99.5%, depending on the membrane type. In the case of a two-stage version of the reverse osmosis system, membranes with a-lower retention capacity for NaOH can also be used.

In both of the method variants described above, the desorber is preferably operated as a vacuum distillation system. In another embodiment, the invention teaches that a partial stream of the regenerated caustic soda that leaves the desorber is passed out and, together with coal water from the coke oven operation, is passed to an evaporator, in which the liquid is concentrated and a stream of steam that is passed to the desorber is generated. The liquid stream that is concentrated in the evaporator is drawn off as waste water.

The coke oven gas that has been cleaned according to the process according to the invention has an $H_2S$ content of less than 0.5 $g/Nm^3$. In this connection, values as low as less than 0.1 $g/Nm^3$ can be achieved, because of the high level of washing activity of the caustic soda used according to the invention. Any slight residual amounts of acid gas components can be washed out in a subsequent microwasher. According to a preferred embodiment of the invention, the microwasher is operated, at least in part, with the washing liquid drawn off from the evaporator, whereby the liquid that is drawn off from the microwasher is passed back into the evaporator.

BRIEF DESCRIPTION OF THE DRAWINGS

In the following, the invention will be explained using a drawing that merely represents an exemplary embodiment. The drawing shows.

DETAILED DESCRIPTION OF PREFERRED EMBODIMENTS

In the method shown in the figures, a coke oven gas COG, which contains $H_2S$ and $NH_3$ as contaminants, is cleaned by washing the gas. In this connection, sulfur compounds and ammonia, in particular, must be removed from the gas stream almost completely.

In the method according to the invention, the coke oven gas COG is washed with caustic soda NaOH, in a counter-stream. Subsequently, the caustic soda is regenerated in a desorber 1, by expelling all of the acid gas components $H_2S$ as well as by expelling ammonia $NH_3$. It is passed into a washing liquid circuit 2 and used again for washing the gas. The consumption of absorbent is balanced out by adding NaOH. Furthermore, waste water that contains sodium salts is withdrawn from the washing liquid circuit 2. The liquid loss is made up by coal water that occurs in the coke oven operation, which can contain ammonium salts.

Figure 1:
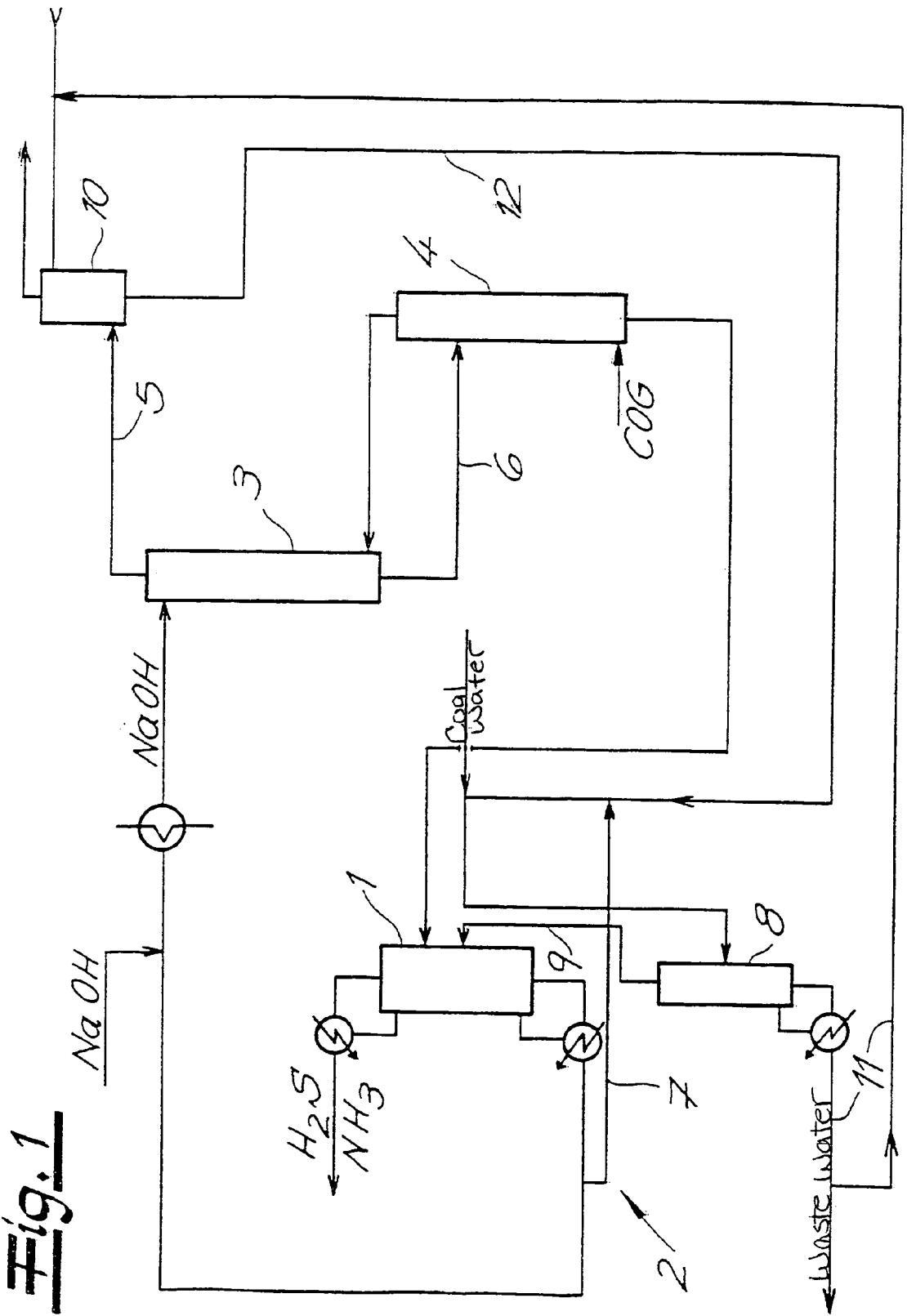
FIG. 1 a schematic of the system of a method according to the invention, for cleaning coke oven gas, FIG. 2 another embodiment of the method according to the invention.

In the method according to the invention as shown in FIG. 1, the gas washing process is operated in two stages. It comprises a first alkaline washing stage 3 for the acid gas components, particularly $H_2S$, as well as a second washing stage 4, which works in the neutral to acidic pH range, for the absorption of ammonia. The caustic soda is added at the head of the first washing stage. The coke oven gas to be cleaned is passed in at the foot of the second washing stage, flows through the two washing stages, one after the other, and is drawn off at the head of the first washing stage, as a cleaned gas stream 5. The washing liquid 6 that flows out of the first washing stage 3 is passed to a top segment of the second washing stage 4. In the exemplary embodiment, the washing stages 3, 4 are configured as separate gas washers, which are connected with one another by means of lines that carry steam and liquid. The gas washers 3, 4 contain usual installations for improving the material exchange. It also lies within the scope of the invention to combine the two washers into a single apparatus.

The desorber 1 is operated as a vacuum distillation system. A partial stream 7 is passed out of the caustic soda that leaves the desorber, and passed to an evaporator 8, together with coal water from the coke oven operation, in which the liquid is concentrated and a stream of steam 9 that is passed to the desorber 1 is generated. The concentrated liquid is drawn off as waste water.

In the exemplary embodiment shown in FIG. 1, a micro-washer 10 is also provided, in which any small residual amounts of acid gas components are washed out of the cleaned gas. The microwasher 10 is operated, at least in part, with the liquid 11 drawn off from the evaporator 8. The liquid 12 drawn off from the microwasher 10 is passed back into the evaporator.

Figure 2:
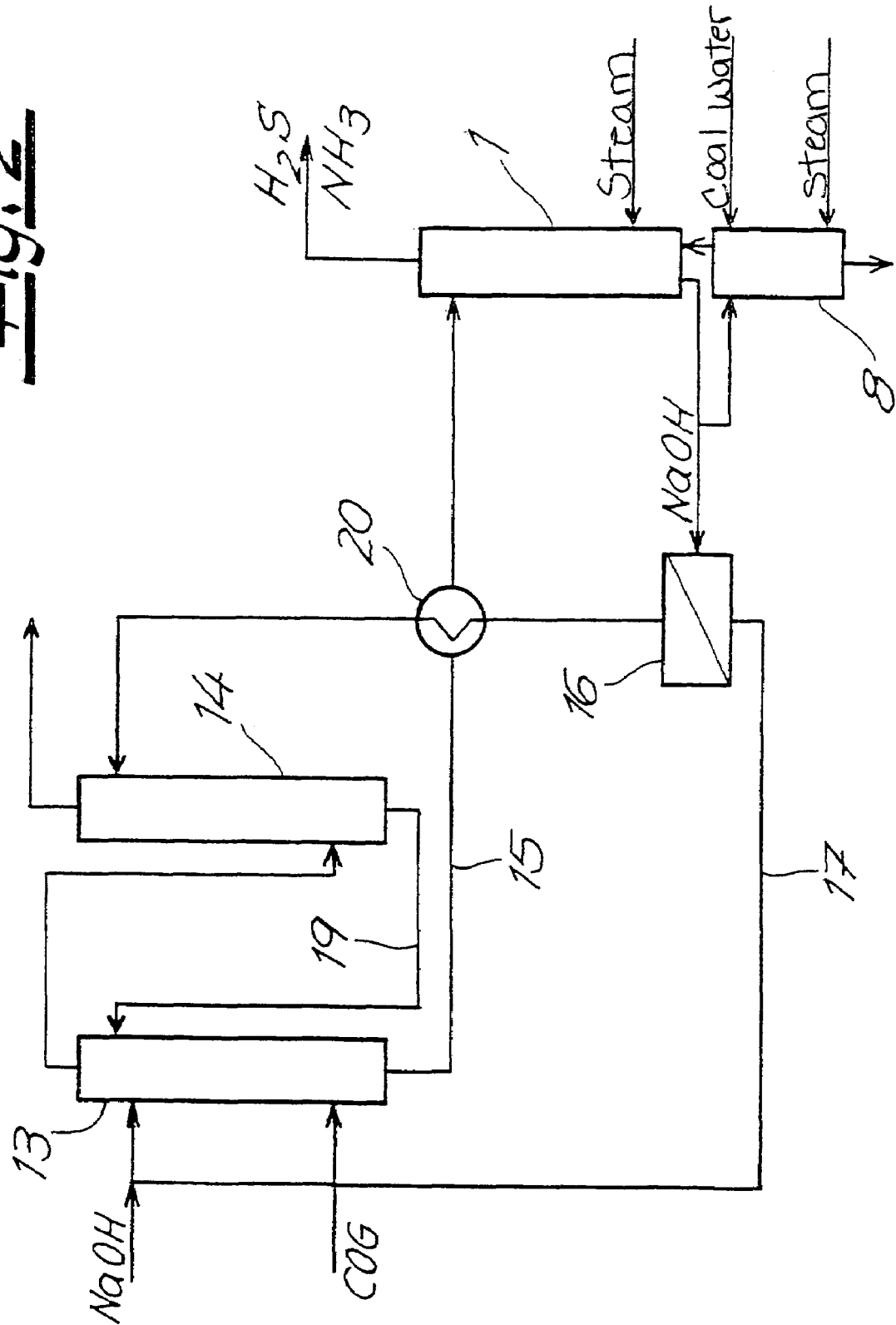

FIG. 2 shows a method variant of the method according to the invention. In the method shown in FIG. 2, the coke oven gas COG to be cleaned is washed with caustic soda NaOH in a first absorber 13, and subsequently passed to a second absorber 14, in which ammonia is removed from the gas stream. Only the washing liquid 15 from the first absorber 13 is passed to the desorber 1, in which the caustic soda NaOH is regenerated and $H_2S$ as well as ammonia $NH_3$ are expelled. The regenerated caustic soda NaOH is separated, in a separating stage 16, into a concentrate stream 17 that is passed back to the first absorber 13 and a liquid stream 18 that is essentially free of NaOH. The latter is passed to the second absorber 14 as a washing liquid and used for the absorption of ammonia. The separating stage 16 preferably consists of a reverse osmosis system that contains reverse osmosis membranes with a high retention capacity for NaOH. The retention capacity for NaOH is preferably at least 99%. The washing liquid 19 drawn off from the second absorber 14 is passed back to the first absorber 13. Finally, it can be seen from FIG. 2 that a heat exchanger 20 is arranged in the inflow to the desorber 1, in which a heat exchange takes place between the permeate stream 18 of the reverse osmosis and the inflow 15 to the desorber 1.

An evaporator 8 is connected with the desorber 1, and coal water, a partial stream branched out from the regenerated caustic soda, as well as steam are passed to it. By adding caustic soda, non-strippable ammonium salts are split into ammonia and NaCl. Released ammonia is stripped in the desorber 1. A concentrated waste water stream is drawn off at the bottom of the evaporator 8.

The invention claimed is:

1. Method for cleaning coke oven gas by washing the gas, whereby caustic soda as a washing liquid is guided into a washing liquid circuit and impurities in said washing liquid are expelled in a desorber for regeneration of the caustic soda, and whereby the coke oven gas is washed with the washing liquid in a counter-flow, comprising the following steps:

washing of the gas which occurs in two stages, and comprises a first alkaline washing stage for the acidic gas components, as well as a second washing stage that works in the neutral to acidic pH range, for the absorption of ammonia, passing the coke oven gas to be cleansed in at a foot of the second washing stage, flowing through the two washing stages, one after the other, and being drawn off at a head of the first washing stage, putting a washing liquid consisting of caustic soda in at the head of the first washing stage, passing the washing liquid that flows out of the first washing stage to a top segment of the second washing stage, lowering the pH of the washing liquid, by an absorption of the acidic gas components, to such an extent that a washing liquid can be used for the absorption of ammonia in the second washing stage, passing the washing liquid into the desorber for regeneration of the caustic soda, whereby in the desorber all the acidic gas components as well as ammonia are expelled, so that only caustic soda remains in the liquid, balancing absorbent losses by adding NaOH to the regenerated caustic soda and returning the washing liquid to the head of the first washing stage, and withdrawing a waste water containing sodium salt from the washing liquid circulation and balancing the liquid loss with coal water that occurs in the coke oven operation.

2. Method for cleaning coke oven gas by washing the gas, whereby caustic soda as a washing liquid is guided into a washing liquid circuit and impurities in said washing liquid are expelled in a desorber, for regeneration of the caustic soda, and whereby the coke oven gas is washed with the washing liquid in a counter-flow, comprising the following steps:

washing a coke oven gas stream to be cleaned with a washing liquid consisting of caustic soda in a first absorber, and subsequently passing it to a second absorber, in which ammonia is removed from the gas stream, passing the washing liquid from the first absorber to the desorber, in which the caustic soda is regenerated and acid gases as well as ammonia are expelled, separating the regenerated caustic soda, in a separating stage, into a concentrate stream that is passed to the first absorber and a liquid stream that is essentially free of NaOH, for the second absorber, balancing absorbent losses by adding NaOH to the concentrate stream and returning the concentrate stream as the washing liquid to the first absorber, passing the washing liquid drawn from the second absorber back to the first absorber, withdrawing a waste water-containing sodium salt from the washing liquid circuit and balancing the liquid loss with coal water that occurs in the coke oven operation, and operating the separating stage as reverse osmosis and using reverse osmosis membranes, which have a high retention capacity for NaOH.

3. Method according to claim 1, wherein the desorber is operated as a vacuum distillation system.

4. Method according to claim 1, wherein a partial stream of the regenerated caustic soda that leaves the desorber is passed out and, together with coal water from the coke oven operation, is passed to an evaporator, in which the liquid is concentrated and a stream of steam that is passed to the desorber is generated.

5. Method according to claim 1, wherein a cleaned gas is passed to a subsequent microwasher, in which any slight residual amounts of acid gas components are washed out.

6. Method according to claim 5, wherein the microwasher is operated, at least in part, with the washing liquid drawn off from an evaporator, and that the liquid that is drawn off from the microwasher is passed back into the evaporator.

* * * * *